United States Patent [19]
Lambert

[11] 4,035,930
[45] July 19, 1977

[54] TIME SELECTIVE INFORMATION DISSEMINATION SYSTEM FOR USE IN SLEEP TEACHING

[75] Inventor: Edmund Baker Lambert, Colorado Springs, Colo.

[73] Assignee: Creative Learning, Inc., Colorado Springs, Colo.

[21] Appl. No.: 587,075

[22] Filed: June 16, 1975

Related U.S. Application Data

[63] Continuation-in-part of Ser. No. 433,823, Jan. 16, 1974, abandoned.

[51] Int. Cl.² .............................................. G09B 5/04
[52] U.S. Cl. .................................... 35/22 R; 35/8 A
[58] Field of Search ................... 35/1, 8 R, 8 A, 9 R, 35/9 A, 22 R, 35 C; 40/28.1, 32; 128/1 C, 2.1 B; 360/63, 74, 78

[56] References Cited

U.S. PATENT DOCUMENTS

| 2,908,767 | 10/1959 | Fritzinger | 360/74 |
|---|---|---|---|
| 2,952,746 | 9/1960 | Sampson | 360/78 X |
| 3,294,924 | 12/1966 | Fein | 179/100.1 |
| 3,584,396 | 6/1971 | Hannah et al. | 35/9 A |
| 3,660,912 | 5/1972 | Laplume | 35/9 A |
| 3,735,503 | 5/1973 | Dow et al. | 35/9 A |
| 3,749,852 | 7/1973 | Moriya et al. | 35/35 C |
| 3,846,831 | 11/1974 | Johnson et al. | 360/74 |

OTHER PUBLICATIONS

The Washington Post; "Dormophone"; Parade Section, Feb. 26, 1950, pp. 18-19.
Stockman, H., "Electronic Sleep Teaching", Proceedings of the I.R.E., Jan. 1951, p. 160.

Primary Examiner—Anton O. Oechsle
Assistant Examiner—Vance Y. Hum
Attorney, Agent, or Firm—John E. Reilly

[57] ABSTRACT

This invention provides a time selective information dissemination system and method for sleep teaching. An information sensor, which is responsive to information that has been recorded on a recording medium, is provided by this system and control mechanism is provided to respond to signals correlated to recording medium travel for controlling transmission from the information sensor to an output apparatus whereby information is utilized in sleep teaching by being disseminated, based upon sensed recording medium travel over predetermined time intervals.

24 Claims, 6 Drawing Figures

TIME SELECTIVE INFORMATION DISSEMINATION SYSTEM FOR USE IN SLEEP TEACHING

BACKGROUND OF THE INVENTION

This application is a continuation-in-part of now abandoned application Ser. No. 433,823, filed Jan. 16, 1974, now abandoned, for TIME SELECTIVE INFORMATION DISSEMINATION SYSTEM FOR USE IN SLEEP TEACHING, by Edmund Baker Lambert.

This invention relates to a novel and improved information dissemination system and method, and more particularly relates to a system and method for sleep teaching by selectively disseminating recorded information at predetermined time intervals.

The dissemination of information by means of recovering information recorded on magnetic tape is well-known, as is the use of endless magnetic tape having a plurality of tracks, or channels, upon which information is stored. Recording and playback equipment is shown by way of general example in U.S. Pat. Nos. 3,207,847 and 3,662,121, while a multiple channel audio system is shown, again by way of example, in U.S. Pat. No. 3,493,681.

The use of recorded information systems as tutoring devices have also been heretofore suggested. See for example, U.S. Pat. No. 3,594,919. Likewise, it has heretofore been suggested that playing back recorded information might be utilized for sleep teaching. Among such suggestions has been a suggestion for electronic sleep teaching appearing in the January, 1951 issue of the Proceedings of the I.R.E. and for code sleep-teaching appearing in the December, 1923 issue of Popular Radio. Neither of these articles, however, appears to detail an information dissemination device for sleep teaching that would be entirely satisfactory in providing a device and/or method that achieves maximum effectiveness. Additionally, these systems which have been designed for playback of information from monaural or stereo tape cartridges have suffered the drawback of introducing undesirable noise, usually caused by the making and breaking of switches or relays, either at the beginning or end of a playing interval. Still further, the prior art systems have not permitted selection between various cycle lengths of the teaching programs.

SUMMARY OF THE INVENTION

It is therefore an object of this invention to provide for a novel and improved time selective information dissemination system for sleep teaching.

It is another object of this invention to provide a time selective information dissemination system for sleep teaching that is directed toward obtaining maximum effectiveness.

It is yet another object of this invention to provide a time selective information dissemination system for sleep teaching which enables information dissemination only at predetermined times and for predetermined time intervals, and specifically is capable of eliminating transmission of undesirable noise either at the beginning or end of the playing intervals.

It is still another object of this invention to provide a time selective information dissemination system for sleep teaching which is capable of playing and replaying information from a magnetic tape over short selected time intervals.

It is yet another object of this invention to provide a novel method of selectively disseminating information to a sleeping person which is highly versatile, relatively inexpensive and easy to control and operate. Broadly, the present invention resides in a time selective information dissemination system and the method for sleep teaching. The system includes information sensing means which is responsive to information that has been recorded on a recording medium, and control means responsive to signals correlated to the travel of the recording medium for controlling transmission from the information sensing means to a sleep teaching utilization means whereby information is disseminated, based upon sensed recording medium travel over a predetermined time interval.

More specifically, a time selective information dissemination system is disclosed for use in sleep teaching for selectively playing information recorded on a multi-track endless magnetic tape. A pair of pick-up heads under the control of a track change solenoid are positioned adjacent to the tracks of the tape to be played. The electrical signal output indicative of recorded information from each pickup head is coupled through amplifiers to a speaker placed near the ear of the sleeper, with an amplifier in each signal path being controlled to assume conductive and non-conductive states by a counting circuit. The counting circuit counts tape travel indications sensed by a pair of contacts positioned adjacent to the magnetic tape and responsive to metallic tape travel indicating strips thereon, an electrical impulse being produced each time a strip is sensed, which impulse is coupled to the counting circuit through a pulse shaper having a delay circuit connected therewith to prevent erroneous sensed indications from being coupled to the counting circuit. A manual switch is utilized to cause track change by energizing the track change solenoid and closing of the manual switch also causes reset of the counting circuit. The counting circuit is preferably connected to an amplifier in each signal path so that each amplifier is caused to successively assume a conductive state for about twenty minutes after sufficient time has elapsed for deep sleep to occur; and after the information on each track adjacent to a pick-up head is successively played, the information on said track is replayed only after a long predetermined silence preferably exceeding two hours.

In an alternate embodiment, dual counters are employed in a somewhat cascaded arrangement. One counter is incremented by regularly recurring pulses such as the signals produced by tape travel reflecting sensors. The content of this first counter controls the gain of a preselected audio amplifier and also increments the second counter which controls the on/off status of the tape drive motor. Thus, by sensing periodic indicia on an endless loop tape, the recorded audio is reproduced for predetermined blocks of time over a predetermined time period after which the system automatically shuts itself off. The track being reproduced can be switched as with the first embodiment or manually fixed as desired. Further, by appropriate counter presetting, short cycle or long cycle operating sequences can be selected.

With the foregoing and other objects in view, which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention are meant to be included, as come within the scope of the claims.

The accompanying drawings illustrate complete embodiments of the invention according to the best modes so far devised for the practical application of the principles thereof.

DESCRIPTION OF THE PREFERRED EMBODIMENTS

Figure 1:
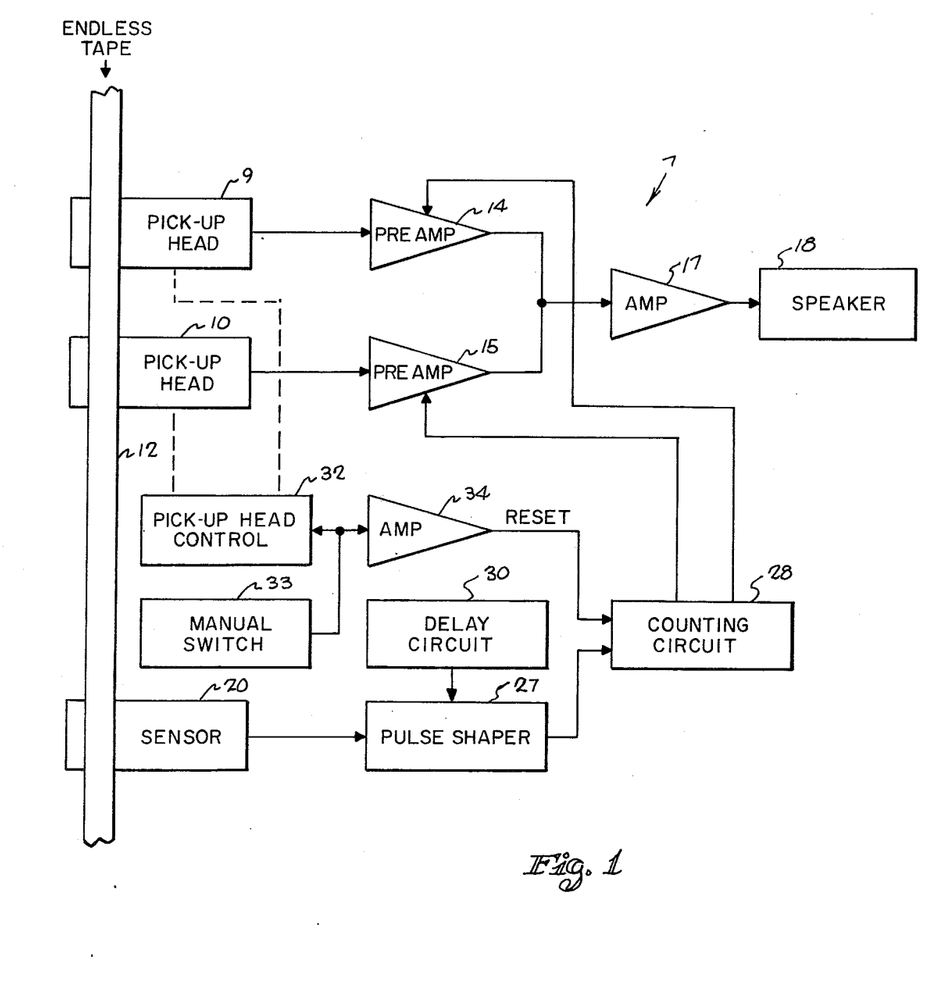
FIG. 1 is a block diagram of one version of the time selective information dissemination system of this invention.
Figure 3:
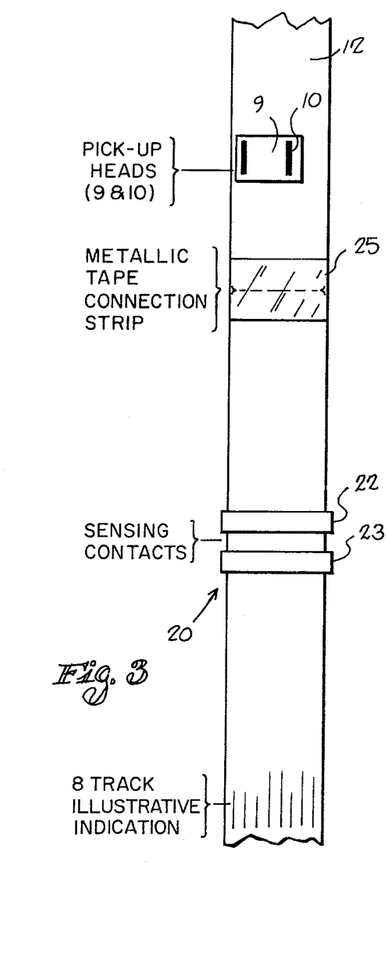
FIG. 3 is an illustrative view showing the tape pick-up heads and travel sensing contacts positioned adjacent to an eight-track endless magnetic tape having a metallic strip thereon for enabling tape travel sensing.

Referring now to the drawings, the number 7 indicates generally a first embodiment of the time selective information dissemination system of this invention. As shown in FIG. 1, system 7 includes a pair of pick-up heads 9 and 10 positioned adjacent to a multitrack endless tape 12. As shown in FIG. 3, pick-up heads 9 and 10 are positioned adjacent to tape 12 so that each pick-up head picks up a different track, the tracks picked up being conventionally spaced four tracks for an eight-track tape (as indicated for illustrative purposes in FIG. 3).

As is conventional, pick-up heads 9 and 10 produce an electrical output signal that is indicative of information that has been recorded on the tape in the track then being sensed. The electrical output signal from pick-up head 9 is coupled to preamplifier 14 while the electrical output signal from pick-up head 10 is coupled to preamplifier 15. The outputs from the two preamplifiers are commonly coupled to amplifier 17, the output of which is coupled to a utilization means designated in the drawings as speaker 18.

Figure 2:
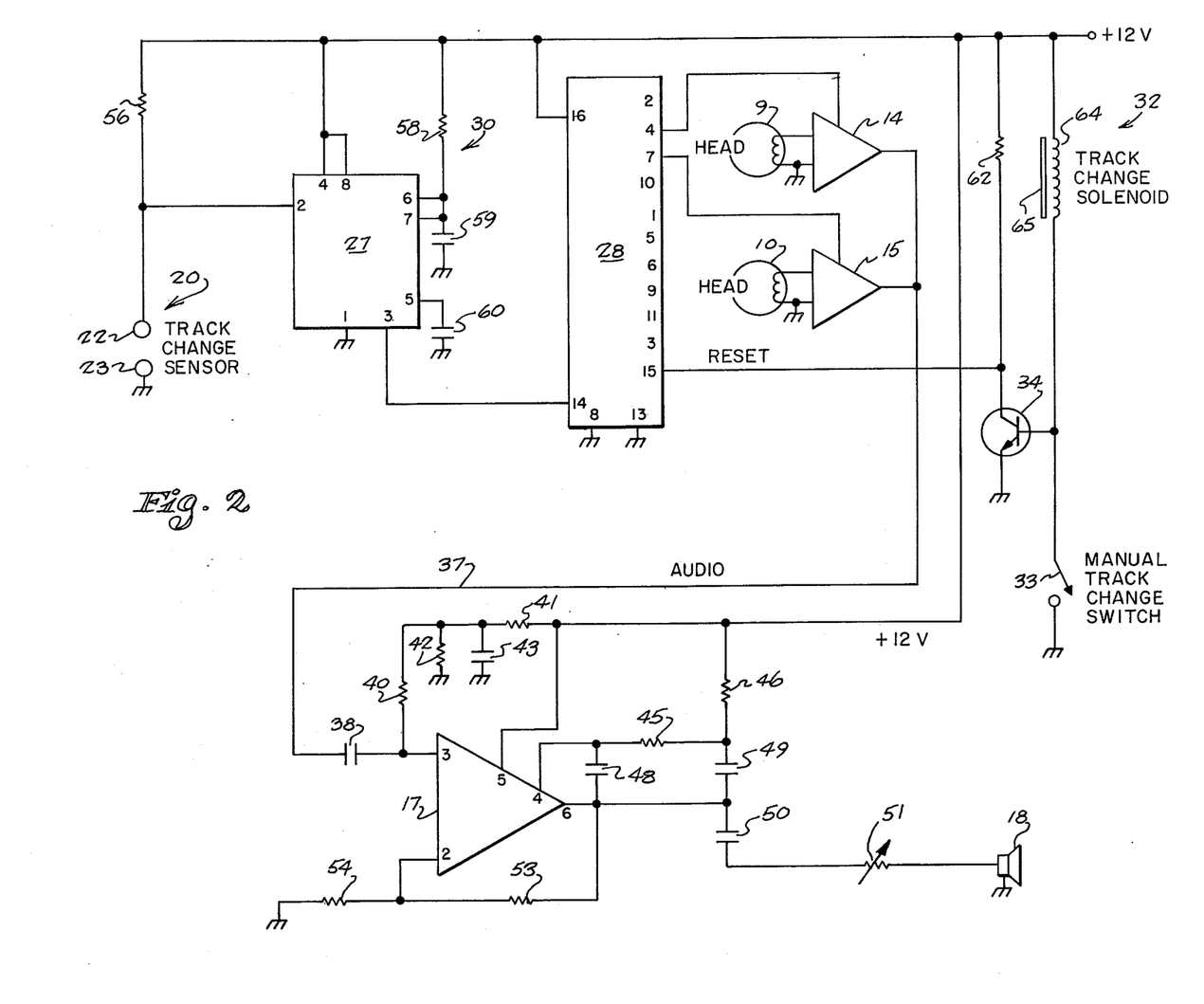
FIG. 2 is a partial block and electronic schematic of the time selective information dissemination system shown in FIG. 1.

A tape travel indicating sensor 20 is also positioned adjacent to tape 12 to provide tape travel indications. As shown in FIGS. 2 and 3, sensor 20 includes a pair of sensing contacts 2 and 23 which are closed, or electrical contact established therebetween, when a metallic strip 25 on the tape 12 passes between the contacts to bridge the gap therebetween. As indicated in FIG. 3, metallic strip 25 can be a connector for connecting the opposite ends of an endless tape, in which event the sensing indicia would indicate a complete revolution of the tape. If desired, sensing indications could be provided more often than a complete revolution by positioning metallic strips at other spaced locations on the tape (now shown). In addition, while FIG. 3 indicates sensor contacts 22 and 23 extending entirely across the tape, other configurations could be utilized as desired.

When sensor 20 senses an indicia strip 25, a pulse output is provided from the sensor and coupled to a pulse shaper 27 where the output pulse is shaped to form a steep portion (either leading or trailing edge) to assure that the pulse when coupled to counting circuit 28 will cause the circuit to perform a counting fraction. A delay circuit 30 is connected with pulse shaping circuits 27 to prevent erroneous indications of tape travel, the metallic strip 25 being of sufficient width, as indicated in FIG. 3, to bridge the sensor contacts for a time interval less than that of the time delay circuit so that the time delay circuit prevents a pulse from being coupled to the counting circuit that is due to erroneous indicating strip sensing by sensor 20.

As is also shown in FIG. 1, a pick-up head control 32 controls positioning of the pick-up heads 9 and 10 so that the heads are positioned adjacent to desired tracks. Pick-up head control 32 is controlled by manual switch 33, the closing of which also resets the counting circuit 28 through amplifier 34.

Referring now to FIG. 2, output signals from pick-up heads 9 and 10 are coupled through amplifiers 14 and 15, respectively, and through lead 37 and capacitor 38 to input pin 3 of amplifier 17. Pin 3 of amplifier 17 is connected through resistor 40 to the junction of series connected resistors 41 and 42, forming a voltage divider between a +12 volt power supply (not shown) and ground. In addition, a bypass capacitor 43 is connected between ground and the junction of resistors 41 and 42, while the +12 volt power supply lead is directly connected to pin 5 of amplifier 17 and pin 4 of amplifier 7 is connected with the power supply lead through series connected resistors 45 and 46. Both sides of resistor 45 are connected to output pin 6 of amplifier 17 through capacitors 48 and 49, and the output from the amplifier is coupled through isolating capacitor 50 and volume control potentiometer 51 to speaker 18. Pin 6 of amplifier 17 is also connected with ground through series connected resistors 53 and 54, the junction of which resistors is also connected to input pin 2 of amplifier 17.

Track change sensor 20 has one contact 23 connected to ground while the other contact 22 is connected to pin 2 of pulse shaper 27 and through resistor 56 to the +12 volt power supply (not shown). Pins 4 and 8 of the pulse shaper 27 are directly connected with the +12 volt power supply lead while pins 6 and 7 are connected to the +12 volt power supply lead through resistor 58 and with ground through capacitor 59. Pin 1 of pulse shaper 27 is grounded while pin 5 is connected with ground through capacitor 60.

The output from pulse shaper 27 is taken from pin 3 and coupled to pin 14 of counting circuit 28, counting circuit 28 also having pin 16 connected with the +12 volt power supply lead and pins 8 and 13 connected to ground. As is conventional, all of the outputs available from counting circuit 28 are initially grounded and each output pin is sequentially connected with a B+ voltage in the following order: 2, 4, 7, 10, 1, 5, 6, 9, 11 and 3. Thus, each time that the sensor 20 senses an indicating strip, the counting circuit is caused to step to the next succeeding position so as to cause the B+ voltage to be applied to the next succeeding output pin.

As further shown in FIG. 2, output pins 4 and 7 are connected to preamplifiers 14 and 15, respectively, to cause each amplifier to assume a conductive state only when a B+ voltage is provided at the associated output pin, each preamplifier being in a non-conductive state to inhibit signal passage through the amplifier when ground is connected with the associated output pin.

As also shown in FIG. 2, the manual track change switch 33 is connected through transistor 34 to reset pin 15 of counting circuit 28. When switch 33 is closed, counting circuit 28 is preset so that the B+ is applied to pin 2 with a ground provided at the other output pins. The collector of transistor 34 is connected both with pin 15 of counting circuit 28 and with the +12 volt power source lead through resistor 62, while the emitter is connected directly with ground.

Manual track change switch 33 is also connected with pick-up head control 32, and more particularly with solenoid 64 therein, which solenoid when energized by closing switch 33, causes a plunger 65 to be activated, said plunger being connected to move pick-up heads 9 and 10 (as indicated by the dotted lines in FIG. 1) to the next succeeding track each time that the plunger 65 is actuated.

In operation, pick-up heads 9 and 10 are connected to different output pins of counting circuit 28 to establish the predetermined time when a program will be picked up by each head and output signals indicative of the program coupled through the associated preamplifier. The pick-up heads are, of course, positioned with respect to the tracks desired by closing switch 33 as needed. Since the pick-up heads for an eight-track system have the pick-up heads normally spaced four tracks apart, this spacing is carried forth when an eight-track endless tape is utilized as has been done in the illustrated example herein. Thus, if tracks 1 and 5 are selected, pick-up head 9 will recover information on track 1 while pickup head 10 will recover information on track 5, these being complementary tracks for an eight-track stereo system.

The program information on each track can be the same for quickly repeating information, or can be different information so that the information is repeated only when the tape goes through a second cycle. Each track will play for twenty minutes as is conventional for an eight-track system, and with two tracks connected to the output pins of counting circuit 28, two 20 minute programs will be presented and 2 hours and 40 minutes of silence will be presented during each cycle. If the two pick-up heads are connected to successive counting circuit output pins, as indicated in FIG. 2, then a program will be played for forty minutes (ie: 20 minutes during which amplifier 14 is enabled followed by 20 minutes during which amplifier 15 is enabled) after which there will be 2 hours and 40 minutes of silence before the program is again repeated. Since preferably the program is not to be played until the person is in a sound sleep, a period of silence is initially provided before the program is started.

When a conventional eight-track system is utilized, the system is turned on initially by inserting the magnetic tape into the machine, after which the machine remains operative until the magnetic tape is removed from the machine. Thus, it is only necessary for a person to insert the magnetic tape into the machine upon retiring and, after a predetermined period of time, two 20 minute programs will be played, after which the system will be silent until the cycle is completed, after which the program will be repeated during the second cycle unless the tape is removed from the machine prior to program presentation during the second cycle.

In order to select another set of programs on the tape cartridge, the track change switch 33 may be depressed to advance the heads 9 and 10 to another set of channels. Each time that the track change switch 33 is depressed the counter is reset to zero through the reset line as shown to return the counter to its starting point for the next sleep cycle.

In view of the foregoing, it should be realized that this invention provides a novel time selective information dissemination system and method for sleep teaching. A particular advantage of that system resides in the fact that the system will advance between playing and non-playing intervals without mechanical switching devices which when activated would tend to awaken a sleeping person. Moreover, several sets of programs may be provided on each tape to present an entire series of instructions.

Figure 4:
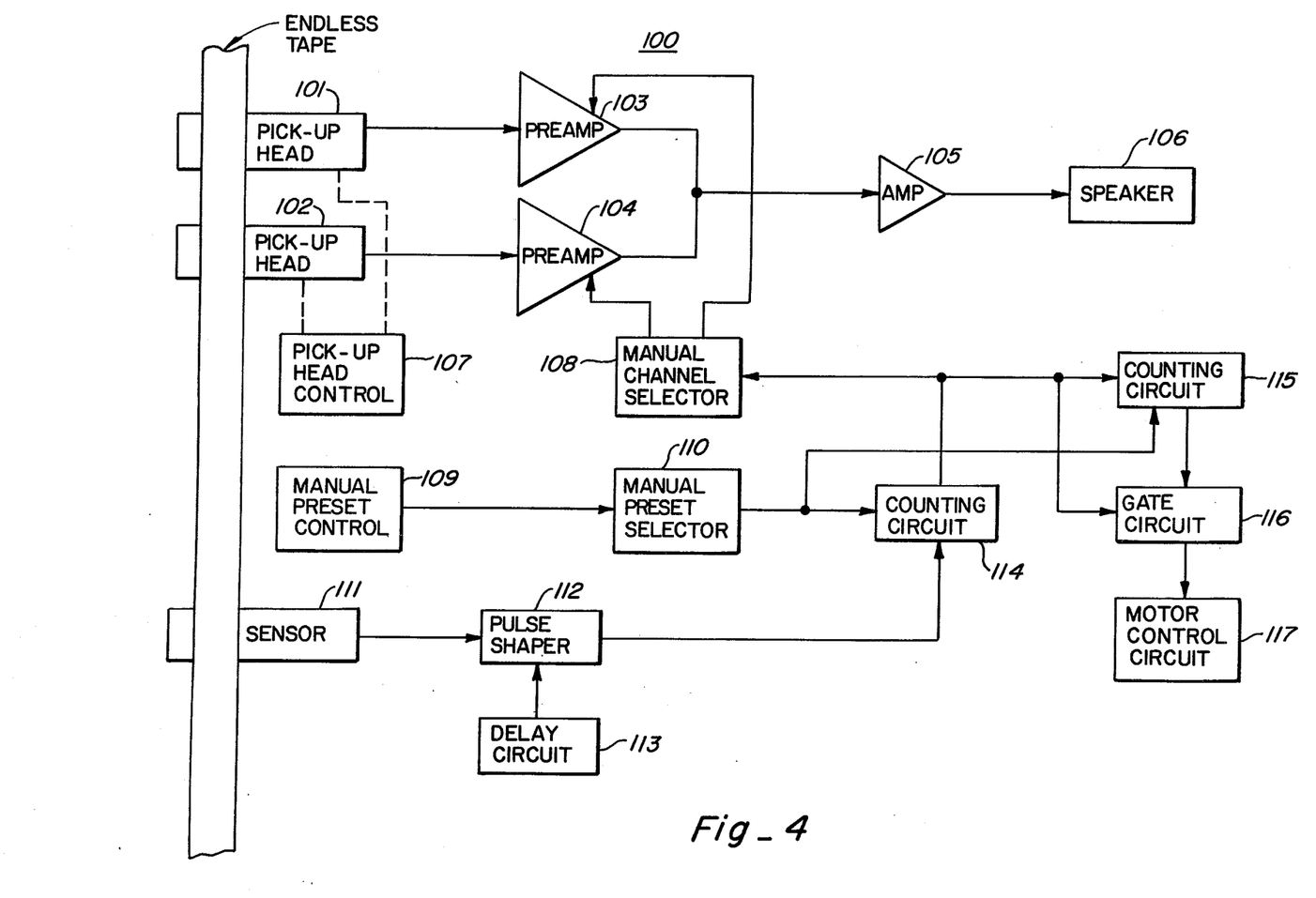
FIG. 4 is a block diagram of an alternative time selection information dissemination system of this invention.
Figure 5:
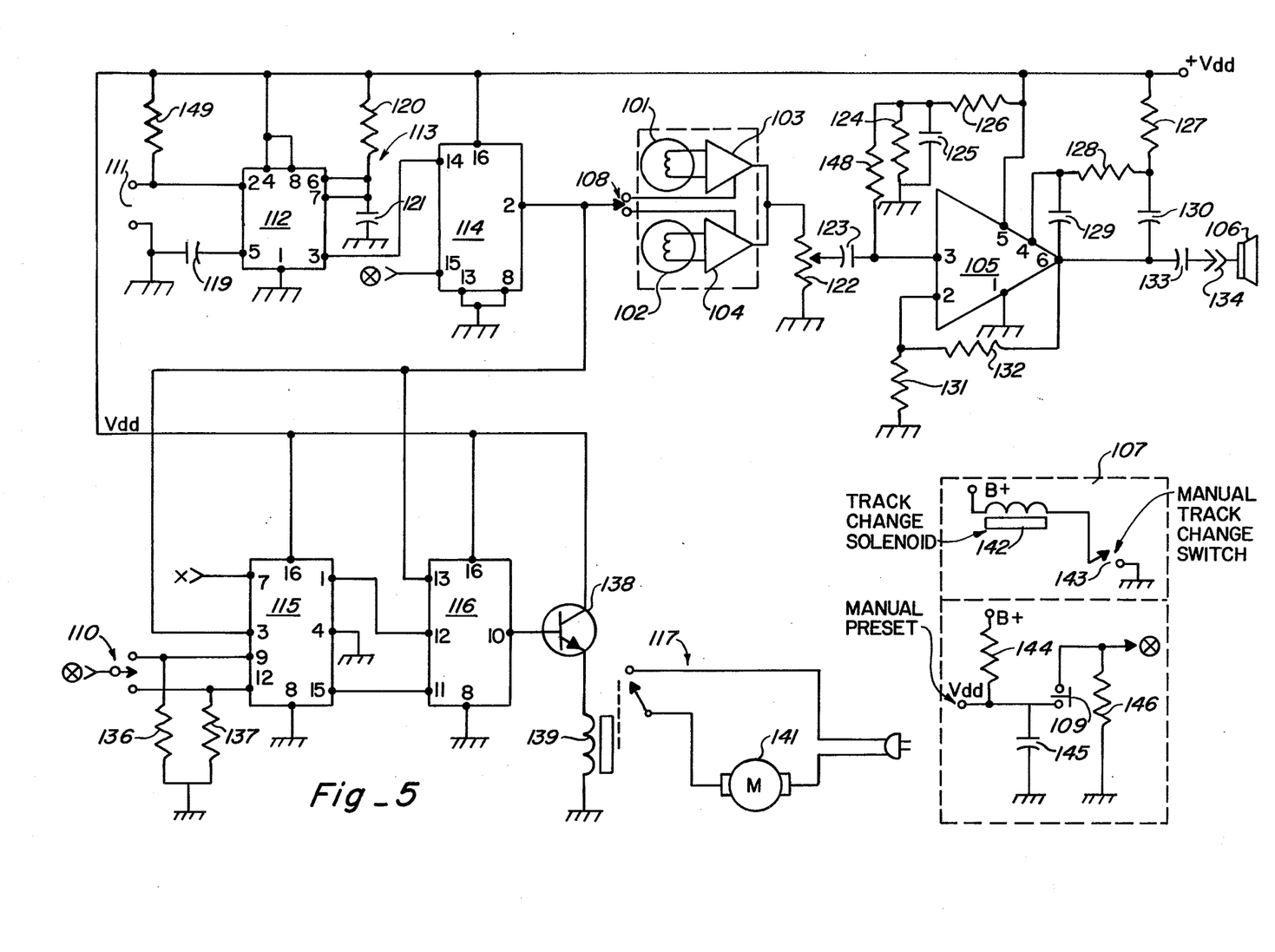
FIG. 5 is a more detailed circuit diagram of the FIG. 4 embodiment.
Figure 6:
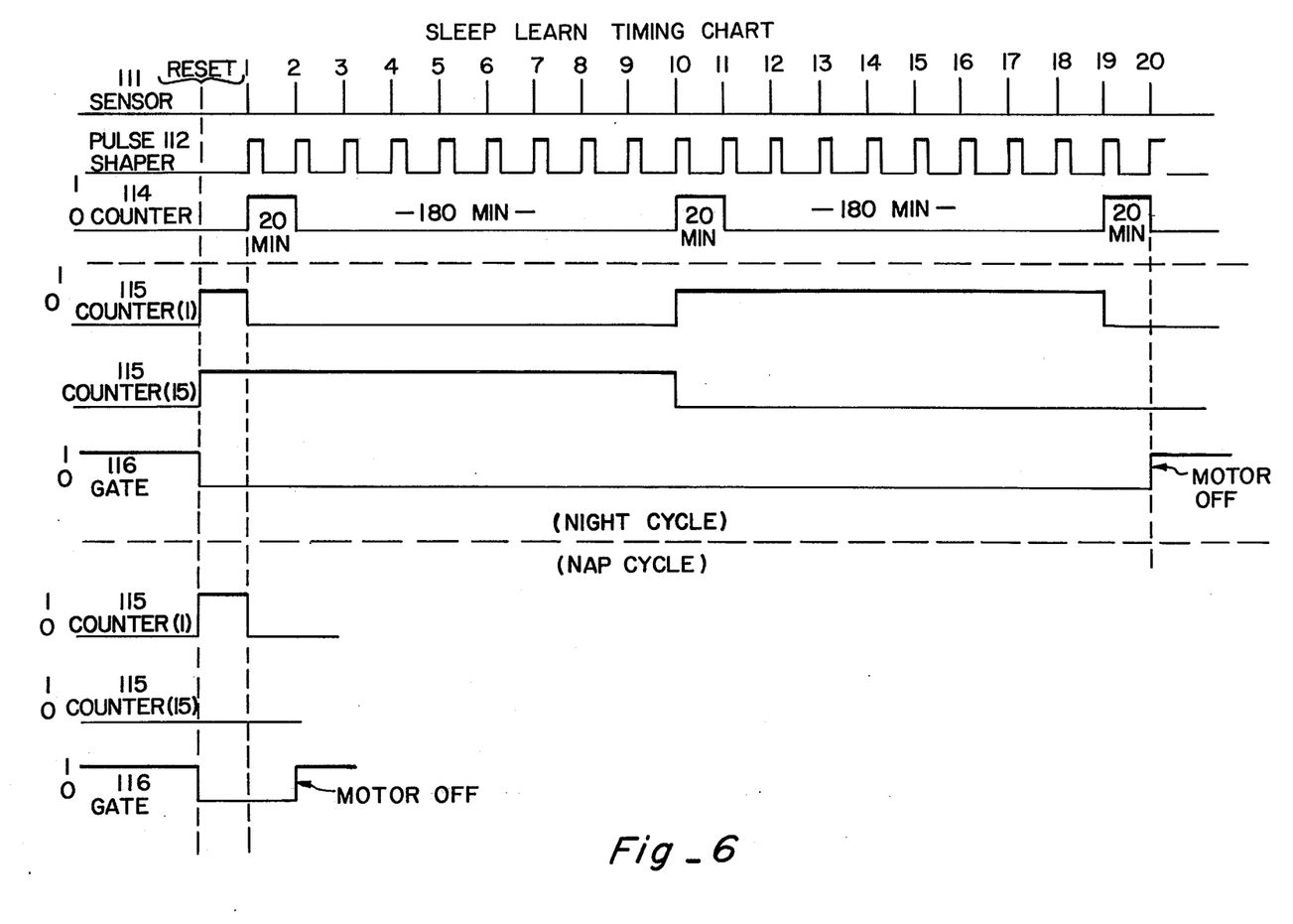
FIG. 6 is a time base diagram of the operation of the FIG. 4 embodiment.

An alternative embodiment of this invention is illustrated in FIGS. 4 and 5 in conjunction with the time base diagram of FIG. 6. As with the FIG. 1 embodiment, the system is particularly adapted for use with an endless loop tape system which includes a travel indicating strip and sensing contacts as is generally illustrated in FIG. 3. A variety of endless loop tape systems are well-known and can be easily adapted for use with the present system. For instance, such systems could include center feed single reel cartridges, closed loop systems including buffer or stuffing boxes or the like. Further, although the embodiment of FIGS. 4–6 is shown using two pick-up heads 101 and 102 and can be correlated to an eight-track system as shown in FIG. 3, it can be easily adapted for use with a single track system or double track tape configuration and need not even require an endless loop in the event that the tape is of sufficient length to accommodate the intended program. Still further, although the embodiments are shown using strip sensing for tape travel indication, various other tape travel detecting systems can be employed such as emitters, other sensing arrangements associated with the tape itself or even timing oscillators for which the FIGS. 4–6 version is particularly well suited.

Briefly, the FIG. 4–6 embodiment uses a two-position manual switch to determine reset of counter circuits for a single (day) or multiple (night) program. The output of the first counting circuit is alternatively connected to an amplifier by utilization of a manual switch for selection of either signal path so that each amplifier is caused to selectively assume a conductive state for about 20 minutes after sufficient time has elapsed for light sleep to occur. After information on the selected channel adjacent to a pick-up head is played, the information of that channel is replayed only after a long predetermined silence preferably exceeding two hours or the system is shut off as determined by the reset selection of the counting circuit. The shut off of the system is pre-determined by utilization of selective present, the output of the first counting circuit being coupled to a second counting circuit and gating circuit to a motor control.

As shown in FIGS. 4–6, the time selective information dissemination system 100 includes a pair of pick-up heads 101 and 102 positioned adjacent to a multi-track endless tape. With such a tape as generally illustrated in FIG. 3, pick-up heads 101 and 102 are positioned adjacent to the tape so that each pick-up head receives a different track, the tracks received being conventionally spaced for tracks for an eight-track tape as is illustrated by way of example.

As is conventional, pick-up heads 101 and 102 produce an electrical output signal that is indicative of information recorded on the tape in the track then being sensed. The electrical output signal from pick-up head 101 is coupled to preamplifier 103 while the electrical output signal from pick-up head 102 is coupled to preamplifier 104. The outputs from the two preamplifiers are commonly coupled to the input of amplifier 105, the output of which is further coupled to a utilization means illustrated in the drawings as speaker 106.

Tape travel indicating sensor 111 is also positioned adjacent to the tape to provide tape travel indications. As shown in FIGS. 4 and 6, sensor 111 includes a pair of sensing contacts which are closed or electrically shorted when metallic strips such as 47 on the tape pass between the contacts to bridge the gap therebetween. Again as is illustrated in FIG. 3, the metallic strip such as 47 can be a connector for splicing the opposite ends of the tape into an endless loop in which event the sensing indicia indicates a complete revolution of the tape. If desired, sensing indications can be provided more often than a complete revolution by positioning additional metallic strips at other spaced locations on the tape (not shown). Still further, various other configuration of tape travel sensors can be employed in place of the sensor which is operative across the entire surface of the tape and, as will be readily apparent from below, oscillator circuits or other timing circuitry can provide pulses which also effectively reflect tape travel movement if this should be desired. However, direct tape travel sensing is preferred since this simplifies the synchronization of system operation with actual tape travel.

Sensor 111 responds to the presence of an indicia strip such as 47 to provide an output pulse which is coupled to a pulse shaper 112. Typically, pulse shaper 112 functions as a square wave pulse forming network wherein the output pulse is shaped to form relatively steep leading and trailing edges to assure that the pulse when coupled to counting circuit 114 causes the counter to increment properly or otherwise perform a correct counting function. Delay circuit 113 provides an integrator operation as illustrated in response to outputs from pulse shaping circuit 112 so as to prevent erroneous indications of tape travel in response to transient signals or the like. That is, the sensor strip such as 47 is of sufficient width to bridge the sensor contacts for a time interval less than that of the time delay circuit or integrator circuit 113 so that the time delay circuit prevents an erroneous pulse from being introduced to counter 114. Accordingly, the operation of integrator 113 assures that sensor 111 has produced a pulse for a minimum length of time which is correlated to the length of a sensor strip or the like.

As shown in the more detailed circuit diagram of FIG. 5, track change sensor 111 has one contact grounded with the other connected to pin 2 of pulse shaper 112 which can physically be a NE55U integrated circuit available from the Signetics Corporation. Resistor 149 couples the contact to the positive power source +Vdd. Pins 4 and 8 of the pulse shaper 112 are directly connected to the positive power source while pins 6 and 7 are connected to Vdd and to ground through the integrator circuit 113 shown as being composed of an RC delay network of resistor 120 and capacitor 121. Pin 1 of pulse shaper 112 is grounded while pin 5 is connected to ground through pulse shaping capacitor 119.

The output from pulse shaper 112 is coupled from pin 3 thereof directly into pin 14 of counting circuit 114. The power source Vdd is coupled into pin 16 of counter 114 with pins 8 and 13 being grounded. Accordingly, each time that sensor 111 detects the presence of an indicating strip on the tape, a pulse is introduced to counter 114 to cause it to step or increment. As further shown in FIG. 5, output pin 2 of counter 114 is coupled into either amplifier 103 or 104 as preselected through manual switch 108 to cause either of these preamplifiers to assume a conductive state only when positive voltage is provided at the associated output pin 2 of counter 114. Each preamplifier 103 and 104 is in a nonconductive state to inhibit signal passage therethrough when an open is presented to the collector biasing of the preamplifiers as is well known.

Pick-up head control 107 determines the positioning of pick-up heads 101 and 102 so that these heads are located adjacent to the desired tracks on the tape. As best seen in FIG. 5, pick-up head control is actuated by the manual switch 143 and this track changing apparatus including the actuation of track change solenoid 142 is similar to that employed in conventional eight-track recording systems. The audio output signals from pick-up heads 101 and 102 are coupled into preamplifiers 103 and 104, respectively, and the outputs of these amplifiers are commonly coupled through volume control potentiometer 122 and coupling capacitor 123 to provide the input to pin 3 of amplifier 105. Pin 3 of amplifier 105 is connected via resistor 148 to the junction of series connected resistors 124 and 126 which form a voltage divider network between the power source and ground so as to provide input biasing for amplifier 105.

In addition, a bypass capacitor 125 is connected between ground and the junction of divider network resistors 124 and 126 while the voltage power supply lead is directly connected to pin 5 of amplifier 105. Power is also supplied to amplifier 105 through the connection of resistors 127 and 128 to pin 4 of amplifier 105. Both sides of resistor 128 are connected to output pin 6 of amplifier 105 through capacitors 129 and 130 thereby forming a biasing and frequency compensation network. The output of amplifier 105 is coupled through coupling and isolating capacitor 13 through jack 134 into speaker 106. Output pin 6 of amplifier 105 is also connected to ground through series connected resistors 131 and 132, the junction of which resistors is also connected to input pin 2 of amplifier forming a feed-back compensation network.

As can be seen in both FIGS. 4 and 5, the output of counter circuit 114 is connected to provide an input to counter circuit 115 and further to provide an input to gate circuit 116 for operation of the motor control circuit 117. Referring to FIG. 5, output pin 2 of counter 114 is directly connected to input pin 3 of counter 115 and input 13 of gate 116. Pin 16 of counter 115 is connected to the power source lead and pins 4 and 8 thereof are directed connected to ground. Pin 7 of counter 115 is connected directly to the preset circuit and pins 9 and 12 of counter 115 are connected to the preset circuit through manual preset selector switch 110 which thereby controls the preset functions of counter 115. That is, preset control manual switch 110 permits the selection of the stage of counter 115 which is to be initially loaded thereby controlling the selecting of operation between single (day) or multiple (night) programs. Pins 9 and 12 of counting circuit 115 are returned to ground through the pull-up resistances 136 and 137.

Output pins 1 and 15 of counting circuit 115 are directly connected to provide inputs to gate circuit 116 as inputs at pins 13 and 11 respectively. Further, gate circuit 116 is powered via connection to pin 16 of Vdd while pin 8 is directly connected to ground. Output pin 10 of gate circuit 116 is directly connected to the base of transistor 138. The collector of resistor 138 is directly connected to the power source lead while the emitter is connected to ground through coil 139 of relay 117 which is the motor control circuit described herein.

As can be seen in FIG. 5, manual track change switch 143 is connected with pick-up head control 107 and more particularly with solenoid 142 therein. Solenoid 142 when energizing by closing switch 143 causes a plunger to be activated, this plunger being connected to move pick-up heads 101 and 102 (as indicated by the dotted lines in FIG. 4) to the next succeeding track each time that the plunger 143 is actuated. Manual preset switch 109 is connected to ground through pulse shaping resistor 146 and the power supply lead. The +12 volt power supply lead Vdd is connected to the B+ through dropping resistor 144 and connected to ground through filter capacitor 145.

In operation, preamplifiers 103 and 104 are connected to output pin 2 of counting circuit 114 to establish the predetermined time when a program will be picked up by either of these preamplifiers and output signals indicative of the program coupled through the associated preamplifier. The pick-up heads are positioned with respect to the track desired by closing switch 143 as needed. Since the pick-up heads for an eight-track system have a pick-up head normally spaced four tracks apart, this spacing is carried forth when an eight-track endless tape is utilized as has been done in the illustrative example herein. Thus, if channel one is selected, pick-up head 101 will recover information on track one and pick-up head 102 will recover information on track five, these being complementary tracks for an eight-track stereo system. It should be noted that some existing eight-track tape systems include apparatus for automatically and sequentially shifting from one track pair to the next each time a loop has been passed by the pick-up heads. It will be readily understood that the present invention can be arranged to accommodate such automatic shifting including appropriate recording of programs on the tracks if this should be desired.

The program information prerecorded on each track can be different information so that the program is repeated only when the tape goes through a second cycle. Each track will typically play for about twenty minutes as is conventional for an eight-track system. Eight different programs can be presented by the system shown in FIGS. 4 and 5. A normal multiple program as might be useful for night teaching will begin after preset of the system with twenty minutes of silence since preferably the program is not to be played until the user is in a light sleep. After the initial silent period, a twenty minute information program is presented followed by another silent period of three hours. Subsequently another 20 minute program of the same information as the first will be presented again followed by three hours of silence. After the second three hours of silence, the third information program is presented after which the system is turned off by the motor control circuit 117 as actuated by both the first counter 114 and second counter 115 via control of gate circuit 116.

In order to select another program on the tape cartridge, channel change switch 143 may be depressed to advance the heads 101 and 102 to another set of channels and manual channel selection switch 108 may be positioned for activation of either preamplifier. For utilization of the system in an abbreviated or single program as might be useful during a day time period, the system operates with one initial silent period and one following information period if preset selection switch 110 is actuated for this cycle prior to utilization of the system.

FIG. 6 illustrates a typical time base operation for circuitry shown in FIGS. 4 and 5. The upper three lines of this diagram are common to both multiple and single cycle operation. Thus, the sensor 111 produces an indicator pulse each time that a twenty minutes cycle of tape movement has gone by which has been used by pulse shaper 112 to provide an incrementing pulse for introduction to counter 114. Counter 114 might typically be an MC14017 ten position counter integrated circuit available through Motorola. The status of output leads 1 and 15 of counter 115 as well as the conditioning of gates 116 are shown for both the short cycle at the bottom of the FIG. 6 chart and the multiple cycle in the middle three lines. Counter 115 might typically be a complementary input JK flip-flop integrated circuit MC14027 available from Motorola while gate 116 can be integrated circuit MC14000 also available through Motorola. The manual preset control 109 introduces a positive potential via connection X into pin 7 of counter 115. Thus by selecting between pin 9 or 12 of counter 115 via the positioning of manual select switch 110, counter 115 can be preset so that both outputs 1 and 15 are positive as for the multiple cycle arrangement or only output 1 can be selected positive as are both illustrated in FIG. 6. Gate 116 functions as an OR circuit in that it will provide an input to the base of transistor 138 whenever there is a positive input from counter 114 or either of stages 1 and 15 of counter 115. However, when none of these three conditioning inputs are present for gate 116, it will change its output state thereby causing semi-conductor 138 to cease conduction and deactuate solenoid 139 so that power is removed from the tape drive motor 141 turning the entire system off. Amplifier 105 is illustrated for connections of an MFC6070 integrated circuit available from Motorola. Note that counter 115 is preset so that at least one of its stages is present so as to enable gate 116 and transistor 138 so as to initiate operation of drive motor 141 and the cycling of the system. The operation of counter 115 determines the full cycle operation of the system regardless of the state of counter 114.

Research has shown that an average person passes through sequences of cyclic sleep phases during typical sleep periods. A sleep cycle is considered to be composed of a light sleep phase followed by a deep sleep phase and finally a light sleep phase. Further it is presently believed that the average person is most conductive to nocturnal learning during tte light sleep phases. Thus, the specific time examples mentioned hereinbefore are correlated with the sleep phase cycles of an average person, such sleep phase cycles determined in conformance with conventional practice and not forming part of this invention. However, it should be recognized that the flexibility of the system shown and described makes it possible to easily accommodate variations in the sleep phase cycling of a given user. For instance, the system can be modified to accommodate an immediate twenty-minute audio cycle when the system operation is initiated. Further, the particular counts of counter stages can be made selectable so as to change the length of the silent periods, the audio output periods, or both.

While the present invention has been described with particularity relative to the foregoing exemplary preferred embodiments, there are other changes, modifications, additions and applications from those mentioned herein which will be readily apparent to those having normal skill in the art without departing from the spirit or scope of this invention.

What is claimed is:

1. A time selective information dissemination system adapted for use in sleep teaching for selectively recovering information recorded on a recording medium having a predetermined rate of medium travel, said dissemination system comprising information sensing means responsive to information recorded on a recording medium and providing electrical output signals indicative thereof; signal transmitting means connected with said information sensing means for receiving said output signals therefrom, said signal transmitting means producing an output when in an enabled state and producing no output while in an inhibited state; utilization means adapted for use with a sleeping person, said utilization means being connected with said signal transmitting means for reproducing recorded information sensed by said information sensing means while said signal transmitting means is in said enabled state; indexing means on said recording medium coextensive with the information recorded thereon; means for producing pulses in response to said indexing means at a rate correlated to the medium travel rate of the recording medium; means responsive to said pulse producing means for generating a control pulse of a predetermined time period; and dissemination control means for receiving said control pulse, said dissemination control means being connected with said signal transmitting means to enable the same automatically in response to the presence of said control pulse and for inhibiting an output from said signal transmitting means in the absence of said control pulse.

2. The time selective information dissemination system of claim 1 wherein said signal transmitting means includes amplifying means enabled by said dissemination control means, and wherein said utilization means includes a speaker positionable near the ear of a sleeping person for reproducing in audible form recorded information coupled through said amplifying means.

3. The time selective information dissemination system of claim 1 for use with a magnetic tape recording medium which has detectable movement indicating indicia thereon, said pulse producing means including means sensing the medium indicia for producing pulses in response thereto, and said information sensing means is a pick-up head for picking up information recorded on a magnetic tape.

4. The time selective information dissemination system of claim 3 wherein said control pulse generating means includes a counting circuit for counting received output indications from said indicia sensing means and producing said control pulse only during predetermined counts.

5. The time selective information dissemination system of claim 4 wherein said system includes a pulse-shaping circuit connected between said counting circuit and said indicia sensing means.

6. The time selective information dissemination system of claim 5 wherein said system includes a delay circuit connected with said pulse-shaping circuit to prevent false indicia sensing indications.

7. The time selective information dissemination system of claim 4 which further includes a second counting circuit for counting pulses from said pulse producing means, and gate circuit means responsive to the presence of predetermined counts in said second counting circuit for enabling the recording medium drive motor.

8. The time selective information dissemination system of claim 7 which further includes means for preselecting the counts in said second counter which enable the recording medium drive motor so as to vary the total cycle time of the system.

9. The time selective information dissemination system of claim 8 wherein said preselecting means include means for presetting counts into said second counting circuit prior to initiation of the system.

10. The time selective information dissemination system of claim 1 wherein said system includes a second information sensing means for selectively recovering information recorded on a recording medium and producing electrical output signals indicative thereof, and second signal transmitting means connected with said second information sensing means for receiving said output signals therefrom with said second information sensing means producing an output while in an enabled state and producing no output while in an inhibited state, and wherein said dissemination control means is also connected with said second signal transmitting means to enable the same during a second predetermined time interval and inhibiting an output from said second signal transmitting means during time intervals other than during said second time interval.

11. A time selective information dissemination system adapted for use in sleep teaching for selectively recovering information recorded on a multi-track endless magnetic tape having tape traveling indicia thereon, said dissemination system comprising a first pick-up head responsive to information recorded on one track of a multi-track endless magnetic tape and providing first electrical output signals indicative thereof; first amplifying means connected with said first pick-up head for receiving said first output signals therefrom, said first amplifying means producing an output when in a conductive state; a second pick-up head responsive to information recorded on a second track of said multi-track endless magnetic tape and providing second electrical output signals indicative thereof; second amplifying means connected with said second pick-up head for recovering said second output signals therefrom, said second amplifying means producing an output when in a conductive state and precluding an output when in a non-conductive state; speaker means adapted to be positionable near the ear of a person, said speaker means being connected with said first and second amplifying means for reproducing in audible form outputs received from said first and second amplifying means; indicia sensing means for sensing travel of said endless magnetic tape and producing output indications thereof; dissemination control means for receiving said output indications from said indicia sensing means, said dissemination control means being connected with said first and second amplifying means to individually control the conductive state of each so that each of said first and second amplifying means is in a conductive state only during a predetermined time interval different from that of the other said amplifying means; and pick-up head control means connected with said pick-up heads for determining the track to be picked up by each said head.

12. The time selective information dissemination system of claim 11 wherein said endless magnetic tape has a metallic tape travel indicia thereon, and wherein said indicia sensing means includes a pair of spaced contacts that are brought into simultaneous contact with said metallic tape travel indicia to establish a closed circuit between said contacts each time that said tape travel indicia passes by said indicia sensing means.

13. The time selective information dissemination system of claim 11 wherein said dissemination control means includes a counting circuit different outputs of which are connected with said first and second amplifying means, wherein said dissemination control means includes a pulse-shaping circuit connected between said counting circuit and said indicia sensing means; and wherein said dissemination control means also includes a delay circuit to prevent erroneous indicia sensing indications.

14. The time selective information dissemination system of claim 13 wherein each of said amplifying means is caused by said counting circuit to be in a conductive state for a predetermined short period of time relative to the time that each said amplifying means is in a non-conductive state with said amplifying means being initially precluded from assuming a conductive state for a predetermined time.

15. The time selective information dissemination system of claim 14 wherein said system is adapted for use in sleep teaching and wherein said counting circuit prevents said amplifying means from assuming a conductive state for a predetermined period of time sufficient to allow the onset of deep sleep, said counting circuit thereafter allowing each said amplifying means to assume a conductive state at different times to permit a program output from said speaker for a selected time period each time that one of said amplifying means is caused to assume said conductive state, with said speaker being silent for another selected time period before the program output is repeated at the speaker when said amplifying means are successively caused to assume a conductive state.

16. The time selective information dissemination system of claim 11 wherein said recording head control means includes a track change solenoid for controlling said pick-up head positioning and a manual switch for energizing said solenoid.

17. The time selective information dissemination system of claim 16 wherein said system includes means connected with said manual switch for resetting said dissemination control means each time that said pick-up heads are shifted to pick up a different track by energization of said track change solenoid.

18. A time selective information dissemination system adapted for use in sleep teaching for selectively recovering information contained on a recording medium which is motivated by a drive motor comprising,
means for generating pulses correlated to the time rate of movement of the recording medium,
first and second counter circuits coupled for counting pulses from said generating means,
at least one transducer means arranged for detecting the information on the recording medium,
amplifier means for receiving the output of said transducer means,
means responsive to at least one preselected count in said first counter circuit for controlling the conductivity of said amplifier means,
speaker means coupled for receiving the output of said amplifier means, and
gate circuit means responsive to the presence of preselected counts in said second counter circuit for enabling the recording medium drive motor from initiation of system operation until a predetermined time thereafter so as to define a system operating cycle,
the counts in said first counter circuit for permitting conductivity of said amplifier means being selected for actuating said speaker means for providing a sequence of at least a silent interval followed by an interval of output from said speaker means during said operating cycle.

19. A time selective information dissemination system in accordance with claim 18 which further includes means for presetting counts into said second counter circuit for selecting the length of the system operating cycle between at least a short time cycle and a long time cycle, said speaker means disseminating information for one interval during said short cycle and for a plurality of intervals during said cycle.

20. A time selective information dissemination system in accordance with claim 18 for use with a magnetic tape recording medium which has movement reflecting detectable indicia thereon, said pulse generating means including sensor means for providing an output pulse in response to detection of the medium indicia for introduction to the input of said first counter circuit, said second counter circuit pulse input being provided by a preselected count in said first counter circuit, said gate circuit means including an OR circuit for providing a medium drive enabling output in the presence of said preselected count of said first counter circuit or said preselected counts in said second counter circuit.

21. A time selective information dissemination system in accordance with claim 20 for use with a multitrack magnetic tape recording medium, said system further including a plurality of said transducer means positioned for detecting the information contained on a respective medium track, a plurality of said amplifier means coupled for receiving the outputs of respective said transducer means, and means selecting one of said amplifier means for conductive enabling by said preselected count responsive means.

22. A time selective information dissemination system in accordance with claim 21 which further includes means for shifting said transducer means between the tracks of the medium.

23. A method of disseminating information to a person from an endless magnetic tape while said person is sleeping, said method comprising advancing the tape at a predetermined rate of speed; initially precluding information dissemination from the tape for a predetermined period of time to allow said person to fall asleep; automatically disseminating first information from the tape in audible form to the sleeping person for a predetermined shorter period of time; automatically disseminating second information in audible form from the tape to the sleeping person; and thereafter automatically precluding information dissemination for a longer period of time relative to said information dissemination so that the intervals of information dissemination and preclusion thereof conform to a predetermined time pattern.

24. The method for disseminating information in accordance with claim 23 wherein said method includes automatically replaying said disseminated information as a repeat thereof after the said longer period of time has elapsed.

* * * * *

UNITED STATES PATENT OFFICE
CERTIFICATE OF CORRECTION

Patent No. 4,035,930     Dated 19 July, 1977

Inventor(s) Lambert, E. B.

It is certified that error appears in the above-identified patent and that said Letters Patent are hereby corrected as shown below:

IN THE SPECIFICATION:

Column 3, line 53, cancel "2" and substitute -- 22 --.
         line 63, cancel "now" and substitute -- not --.

Column 4, line 3, cancel "fraction" and substitute -- function --.
         line 62, cancel "amplifier" and substitute -- preamplifier --.
         line 65, cancel "amplifier" and substitute -- preamplifier --.

Column 5, line 29, cancel "pickup" and substitute -- pick-up --.

Column 6, line 52, cancel "present" and substitute -- preset --.

Column 8, line 38, cancel "13" and substitute -- 133 --.
         line 42, after "amplifier" add -- 105 --.

UNITED STATES PATENT OFFICE
CERTIFICATE OF CORRECTION

Patent No. 4,035,930          Dated 19 July, 1977

Inventor(s) Lambert, E. B.

It is certified that error appears in the above-identified patent and that said Letters Patent are hereby corrected as shown below:

Column 9, line 9, cancel "energizing" and substitute -- energized --.

Column 10, line 52, cancel "tte" and substitute -- the --.

*Signed and Sealed this*

*Twenty-seventh* Day of *June 1978*

[SEAL]

Attest:

RUTH C. MASON
*Attesting Officer*

DONALD W. BANNER
*Commissioner of Patents and Trademarks*